(12) United States Patent
Park et al.

(10) Patent No.: US 10,177,592 B2
(45) Date of Patent: Jan. 8, 2019

(54) WIRELESS POWER TRANSMITTER AND WIRELESS POWER TRANSMISSION METHOD

(71) Applicant: LG ELECTRONICS INC., Seoul (KR)

(72) Inventors: Yongcheol Park, Seoul (KR); Hyunbeom Lee, Seoul (KR); Jaesung Lee, Seoul (KR); Byungsang Jung, Seoul (KR); Jinmoo Park, Seoul (KR); Seonghun Lee, Seoul (KR); Jihyun Lee, Seoul (KR); Jeongkyo Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 15/303,413

(22) PCT Filed: Apr. 10, 2015

(86) PCT No.: PCT/KR2015/003594
§ 371 (c)(1),
(2) Date: Oct. 11, 2016

(87) PCT Pub. No.: WO2015/156628
PCT Pub. Date: Oct. 15, 2015

(65) Prior Publication Data
US 2017/0047786 A1 Feb. 16, 2017

Related U.S. Application Data

(60) Provisional application No. 61/978,592, filed on Apr. 11, 2014, provisional application No. 61/979,867, filed on Apr. 15, 2014.

(51) Int. Cl.
H01F 27/42 (2006.01)
H01F 37/00 (2006.01)
(Continued)

(52) U.S. Cl.
CPC ............... *H02J 7/025* (2013.01); *H02J 7/02* (2013.01); *H02J 17/00* (2013.01); *H02J 50/10* (2016.02);
(Continued)

(58) Field of Classification Search
CPC .. H02J 50/12; H02J 50/40; H02J 50/80; H02J 7/025; H02J 7/02
(Continued)

(56) References Cited

U.S. PATENT DOCUMENTS

2003/0214821 A1 11/2003 Giannopoulos et al.
2014/0191568 A1* 7/2014 Partovi ................... H02J 7/025
307/9.1
(Continued)

FOREIGN PATENT DOCUMENTS

EP 2 685 601 A2 1/2014
JP 2010-268665 A 11/2010
(Continued)

Primary Examiner — Rexford Barnie
Assistant Examiner — Jagdeep Dhillon
(74) Attorney, Agent, or Firm — Birch, Stewart, Kolasch & Birch, LLP

(57) ABSTRACT

A wireless power transmitter is disclosed. The wireless power transmitter, which is capable of charging a plurality of wireless power receivers, includes: a plurality of coil cells; a main half-bridge inverter to which a main pulse signal is applied; a plurality of sub half-bridge inverters to which a first sub pulse signal or second sub pulse signal is applied; a current sensor that monitors the current through the coil cells; and a communications and control unit that controls the pulse signals applied to the main half-bridge inverter and sub half-bridge inverters and that communicates with the wireless power receivers, wherein the sub half-bridge inverters may be respectively connected to the coil cells.

13 Claims, 16 Drawing Sheets

(51) Int. Cl.
- *H01F 38/00* (2006.01)
- *H02J 7/02* (2016.01)
- *H02J 17/00* (2006.01)
- *H02J 50/80* (2016.01)
- *H02J 50/90* (2016.01)
- *H02J 50/12* (2016.01)
- *H02J 50/60* (2016.01)
- *H02J 50/10* (2016.01)
- *H02J 50/40* (2016.01)

(52) U.S. Cl.
CPC .............. *H02J 50/12* (2016.02); *H02J 50/40* (2016.02); *H02J 50/60* (2016.02); *H02J 50/80* (2016.02); *H02J 50/90* (2016.02)

(58) Field of Classification Search
USPC .... 307/9.1, 10.1, 104, 149, 11, 31; 320/108, 320/109
See application file for complete search history.

(56) References Cited

U.S. PATENT DOCUMENTS

| | | | |
|---|---|---|---|
| 2015/0256081 A1* | 9/2015 | Bakran | H02M 3/33584 363/21.01 |
| 2016/0233780 A1* | 8/2016 | Choi | G01R 21/133 |
| 2017/0098957 A1* | 4/2017 | Sankar | H02J 50/10 |
| 2017/0170686 A1* | 6/2017 | Van Wageningen | H02J 50/10 |

FOREIGN PATENT DOCUMENTS

| | | |
|---|---|---|
| JP | 2008-104295 A | 8/2012 |
| JP | 2013-27076 A | 2/2013 |
| KR | 10-0911763 B1 | 8/2009 |
| KR | 10-2012-0085498 A | 8/2012 |
| WO | WO 2009/045847 A2 | 4/2009 |
| WO | WO 2012/005607 A2 | 1/2012 |
| WO | WO 2013/011729 A1 | 1/2013 |
| WO | WO 2014/035260 A1 | 3/2014 |
| WO | WO 2014/042681 A2 | 3/2014 |

* cited by examiner

[Figure 1]
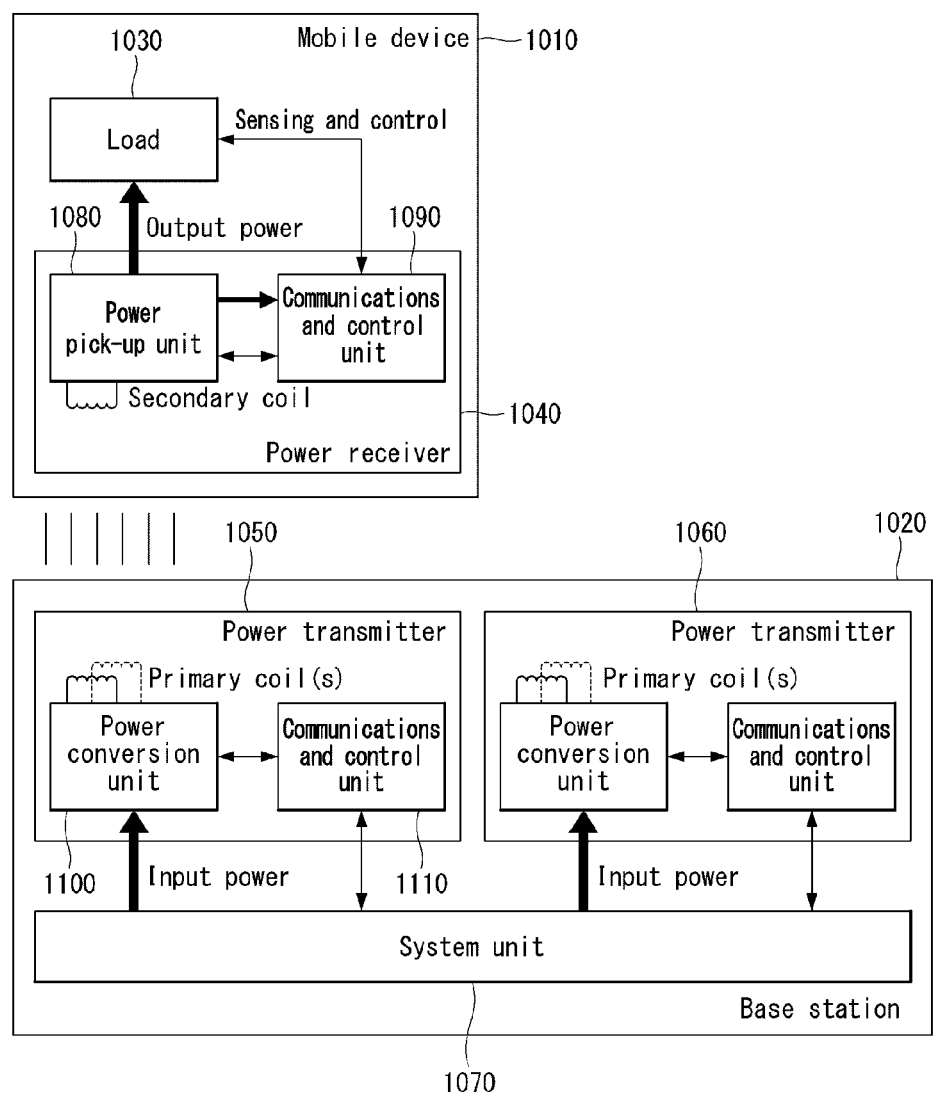

【Figure 2】
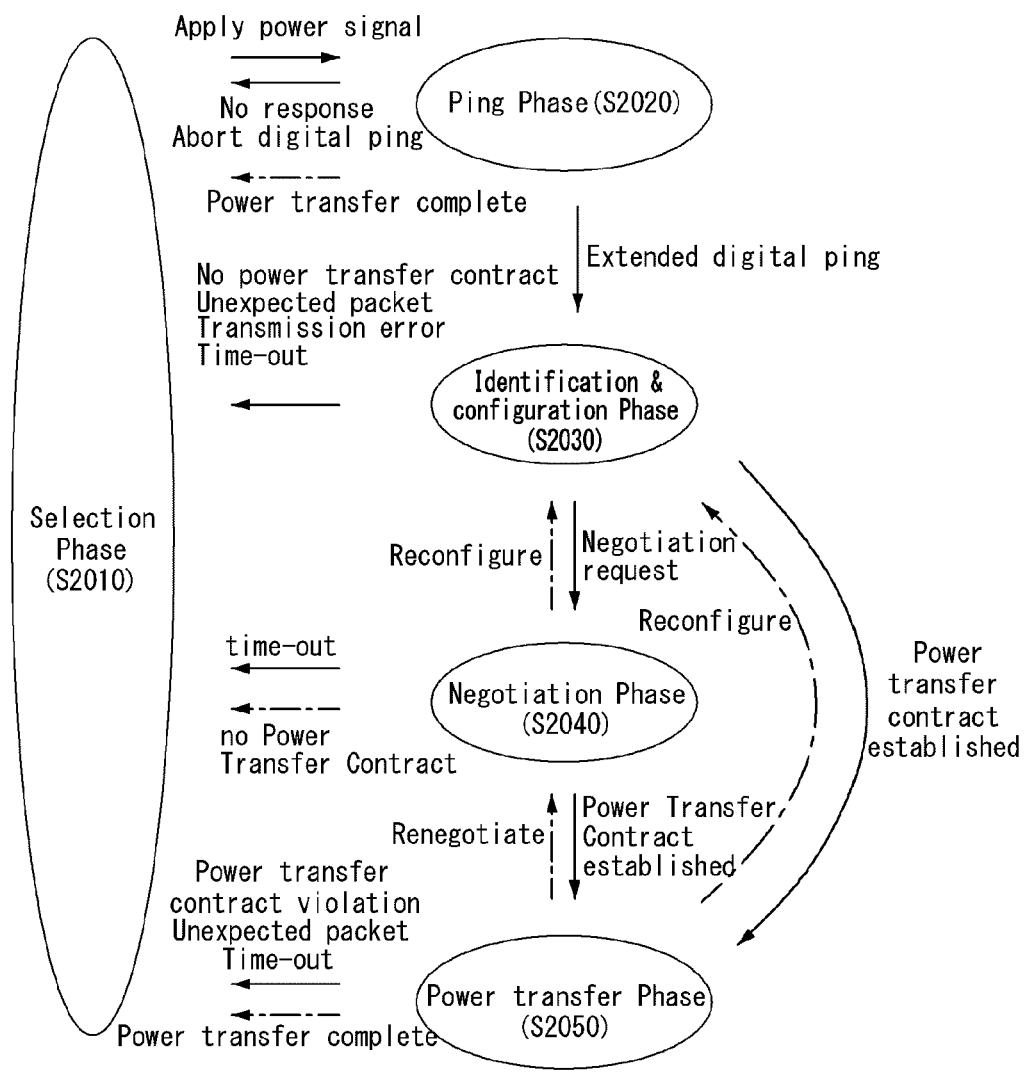

[Figure 3]
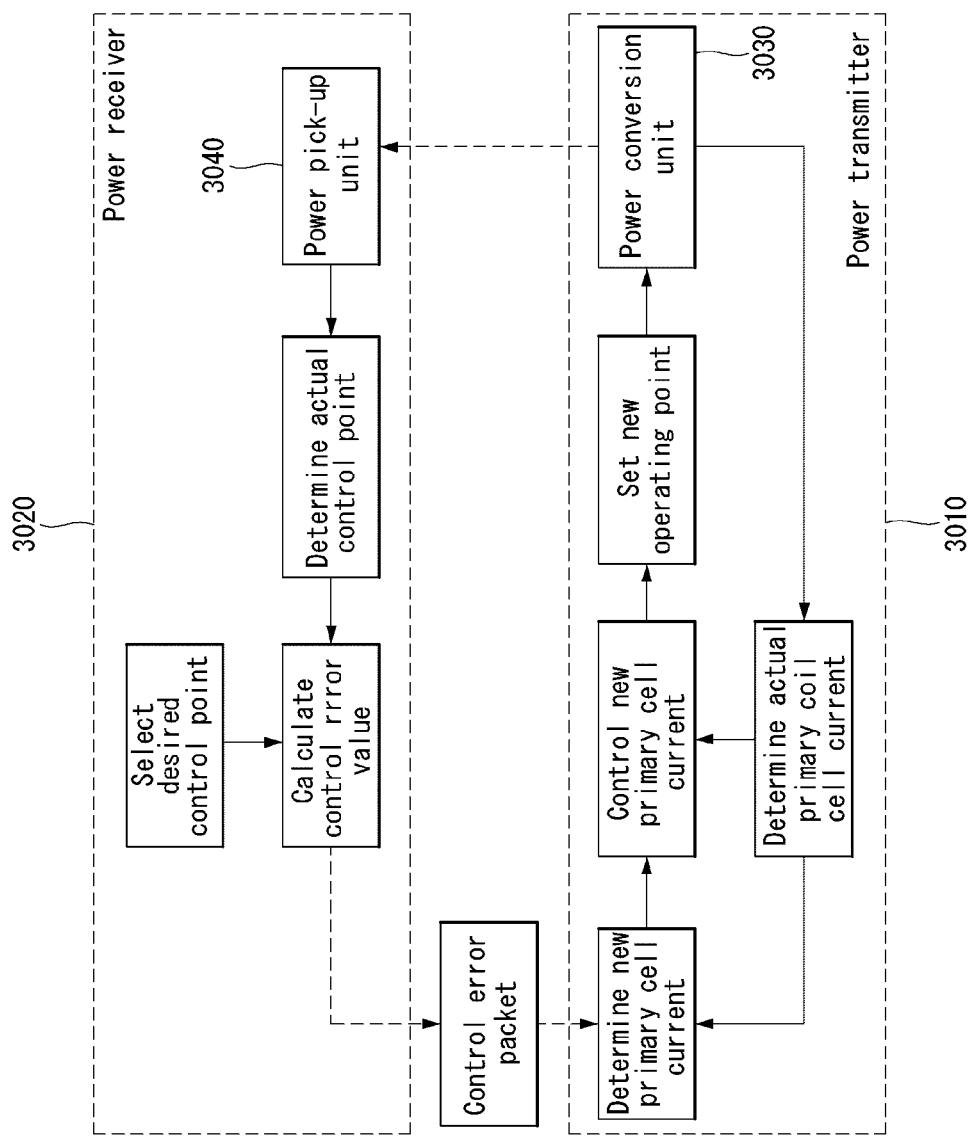

[Figure 4]
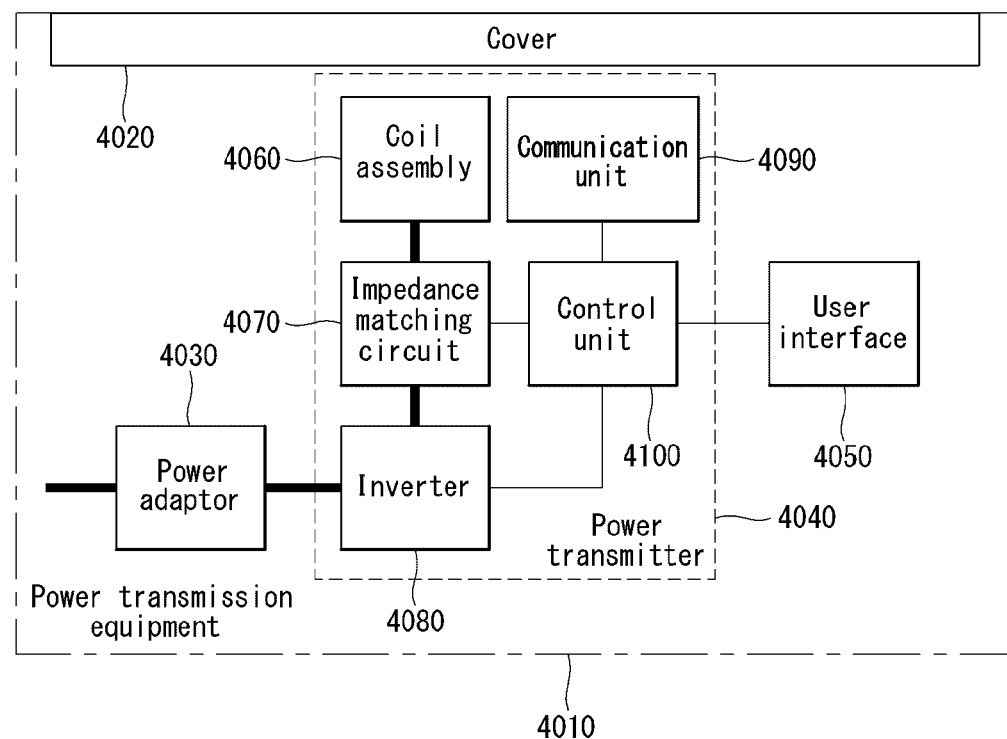

【Figure 5】
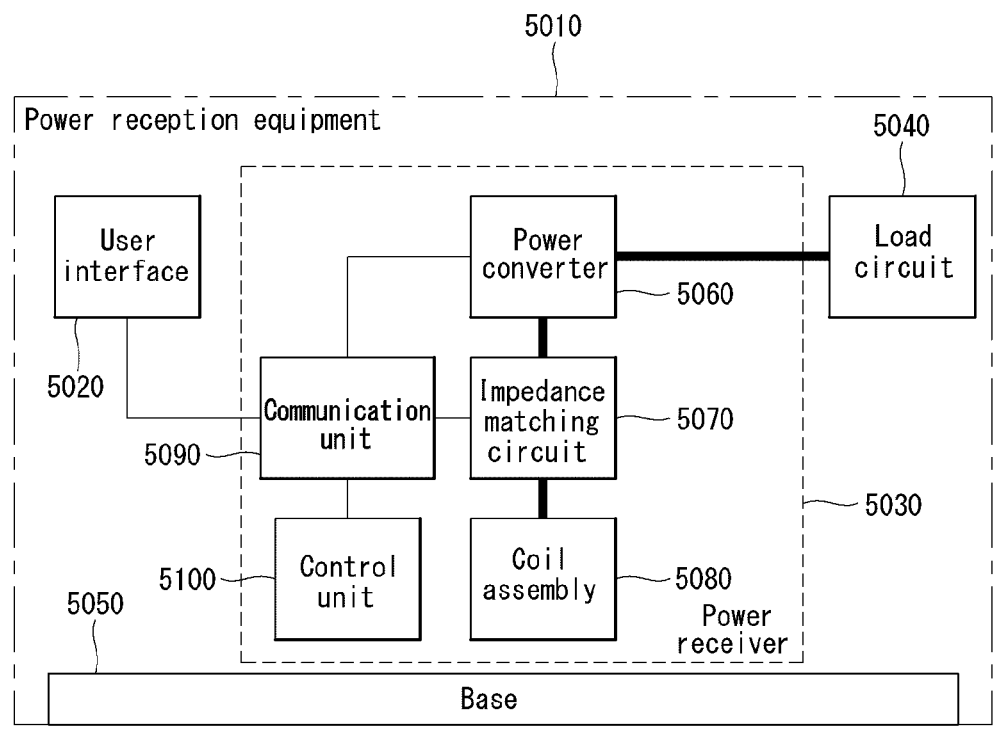

[Figure 6]
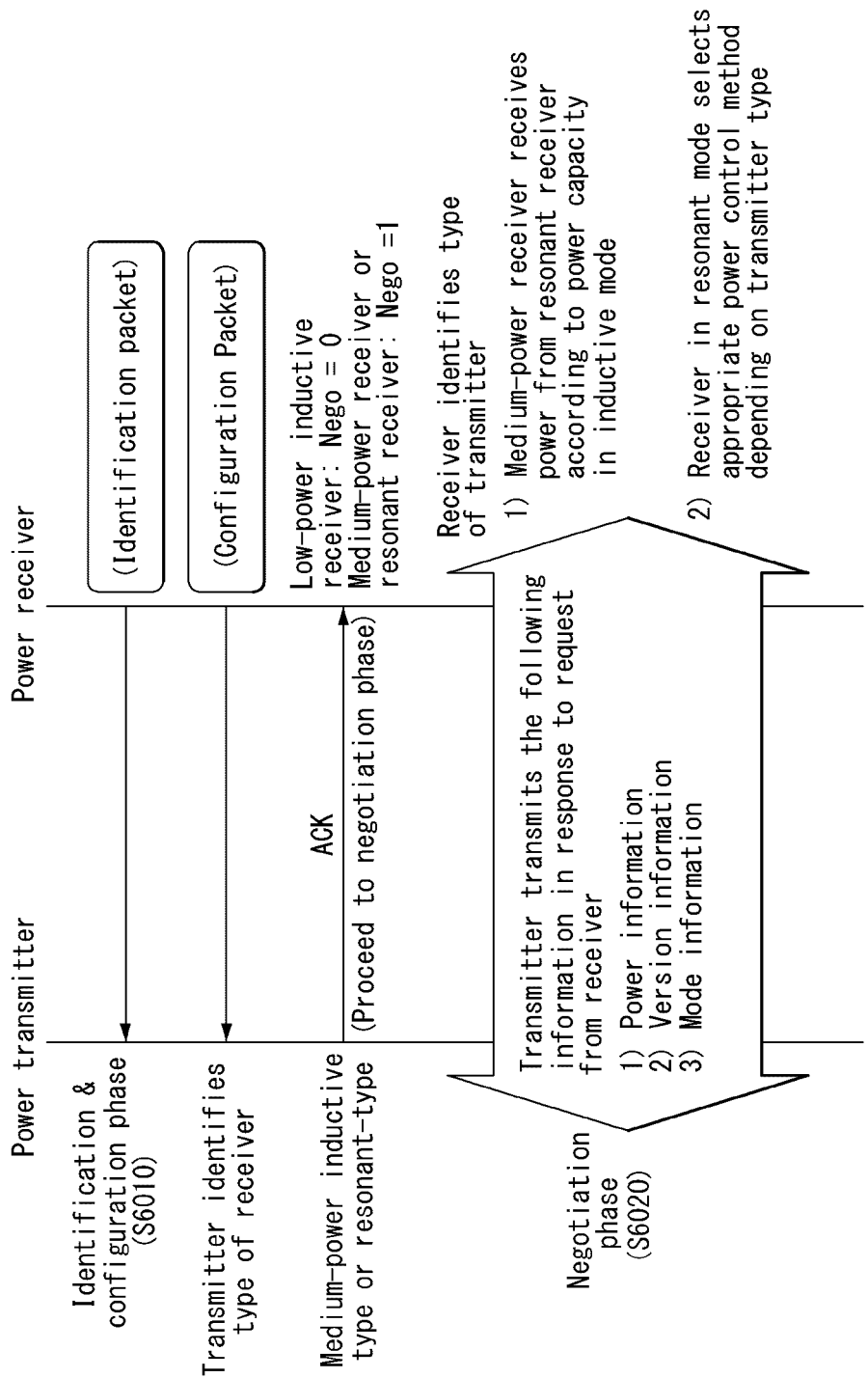

[Figure 7]

(a) Configuration packet of receiver

|    | b7 | b6 | b5 | b4 | b3 | b2 | b1 | b0 |
|----|----|----|----|----|----|----|----|----|
| B0 | Power Class | | Maximum Power | | | | | |
| B1 | Reserved | | | | | | | |
| B2 | Prop | OP Mode | Reserved | Reserved | X | Count | | |
| B3 | Window Size | | | | Window Offset | | | |
| B4 | Neg | FSKPolarity | FSKDepth | | Reserved | | | |

(b) Configuration packet of receiver

|    | b7 | b6 | b5 | b4 | b3 | b2 | b1 | b0 |
|----|----|----|----|----|----|----|----|----|
| B0 | Guaranteed Power Class | | Guaranteed Power | | | | | |
| B1 | Potential Power Class | | Potential Power | | | | | |
| B2 | OP Mode | | Reserved | | | | | |

[Figure 8]

(a) Low-power inductive-type power transmitter

| Low-power inductive transmitter (TX) | Low-power inductive receiver (Rx) | Medium-power inductive receiver (Rx) | Resonant receiver (Rx) |
|---|---|---|---|
| Digital ping | Rx→Tx | Rx→Tx | Rx→Tx |
| Identification & configuration phase | Rx→Tx | Rx→Tx | Rx→Tx |
| Negotiation phase | Skip | Skip | Skip |
| Power transfer phase | Rx→Tx | Rx→Tx | Rx→Tx |

(b) Medium-power inductive type power transmitter

| Medium-power inductive transmitter (TX) | Low-power inductive receiver (Rx) | Medium-power inductive receiver (Rx) | Resonant receiver (Rx) |
|---|---|---|---|
| Digital ping | Rx→Tx | Rx→Tx | Rx→Tx |
| Identification & configuration phase Negotiation phase | Rx→Tx Skip | Rx→Tx Rx(M)←—→Tx(S) | Rx→Tx Rx(M)←—→Tx(S) |
| Power transfer phase | Rx→Tx | Rx→Tx | Rx→Tx |

(c) Resonant-type power transmitter

| Resonant receiver (Tx) | Low-power inductive receiver (Rx) | Medium-power inductive receiver (Rx) | Resonant receiver (Rx) |
|---|---|---|---|
| Digital ping | Rx→Tx | Rx→Tx | Rx→Tx |
| Identification & configuration phase Negotiation phase | Rx→Tx Skip | Rx→Tx Rx(M)←—→Tx(S) | Rx→Tx Rx(M)←—→Tx(S) |
| Power transfer phase | Rx→Tx | Rx→Tx | Rx(S)←—→Tx(M) |

【Figure 9】

ID assignment packet

| | b7 | b6 | b5 | b4 | b3 | b2 | b1 | b0 |
|---|---|---|---|---|---|---|---|---|
| B0 | Reserved | | | | ID | | | |

[Figure 10]
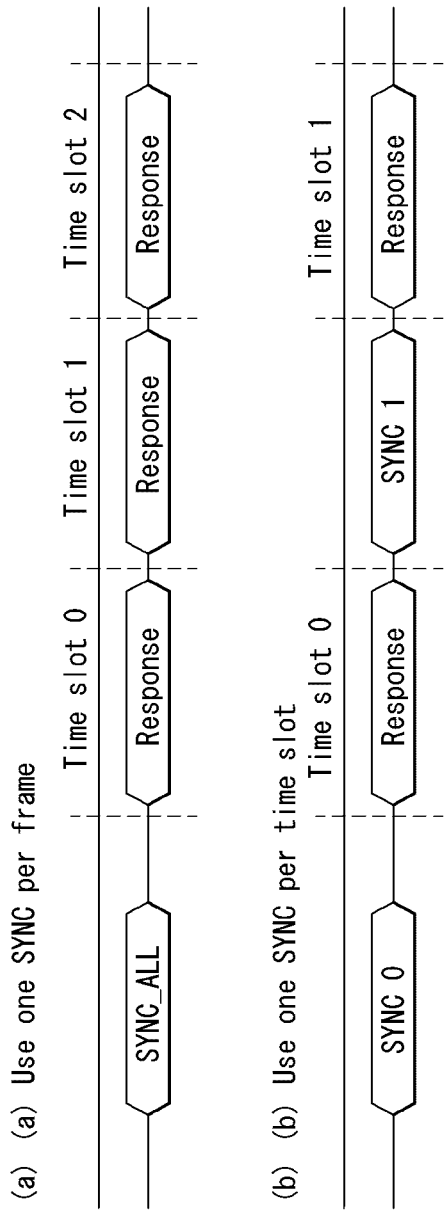

[Figure 11]
TX Sync packet
|  | b7 | b6 | b5 | b4 | b3 | b2 | b1 | b0 |
|---|---|---|---|---|---|---|---|---|
| B0 | ADDR ID (SYNC) | | | | Request | | | |
[Figure 12]
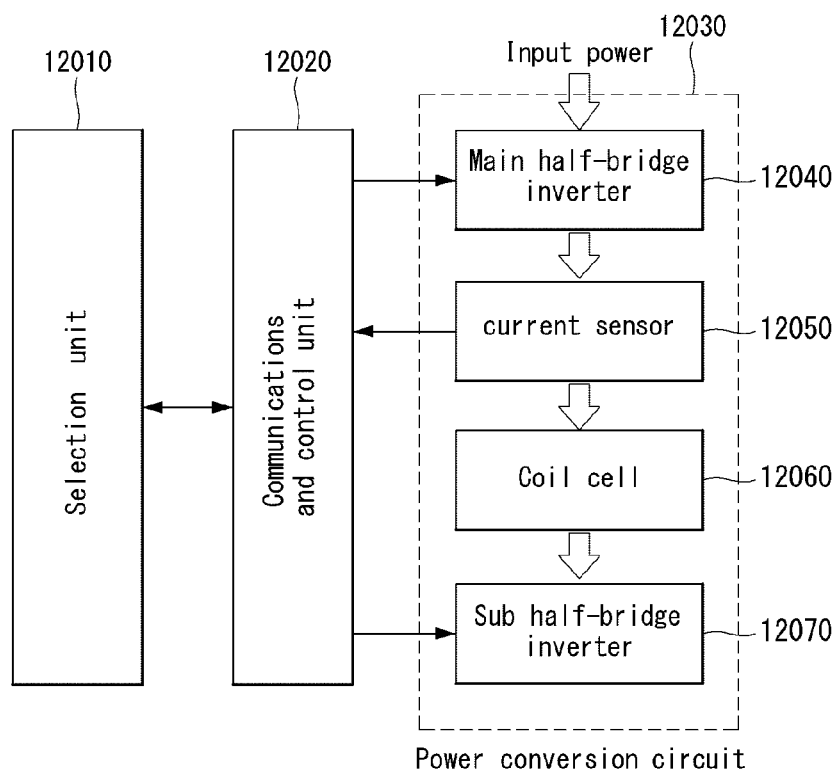

【Figure 13】
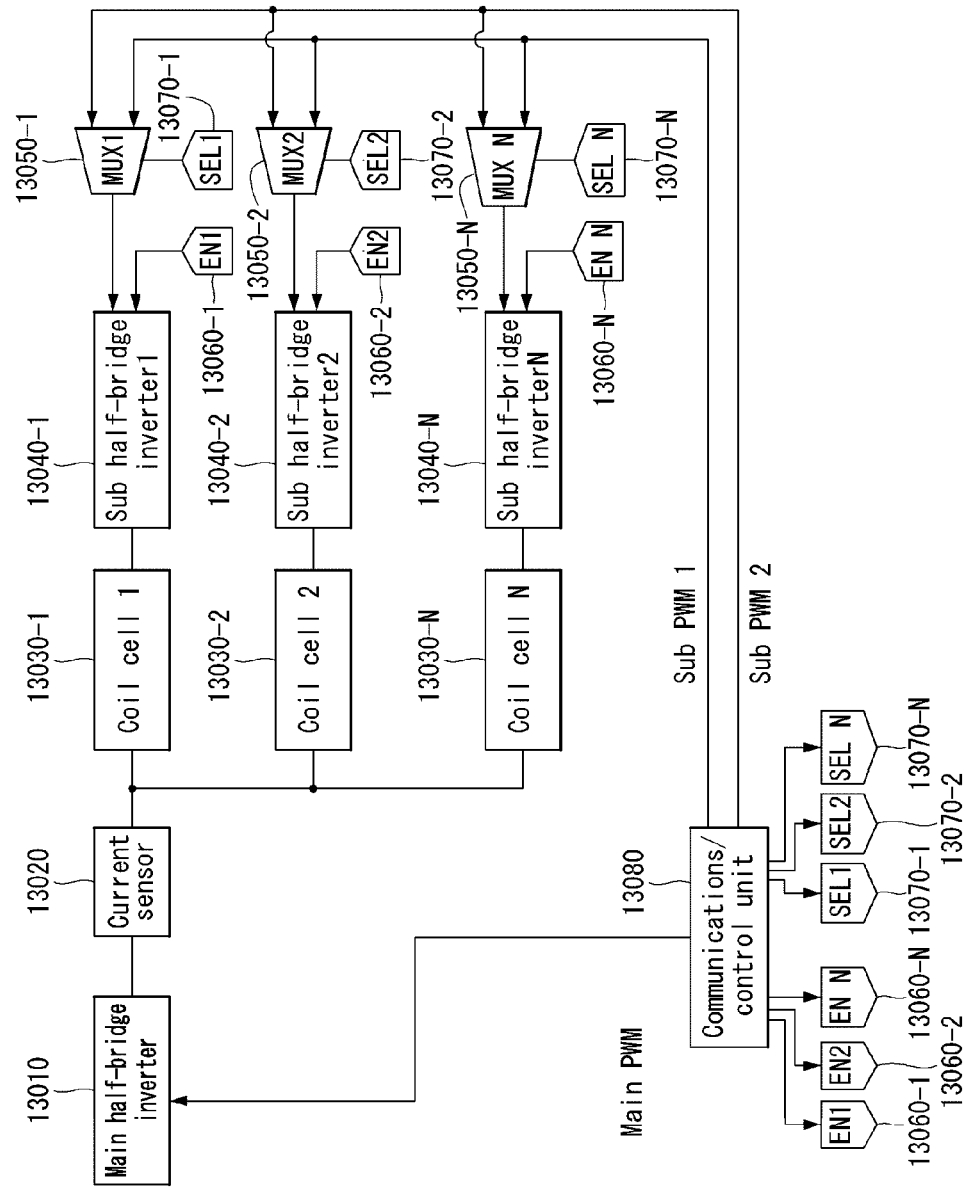

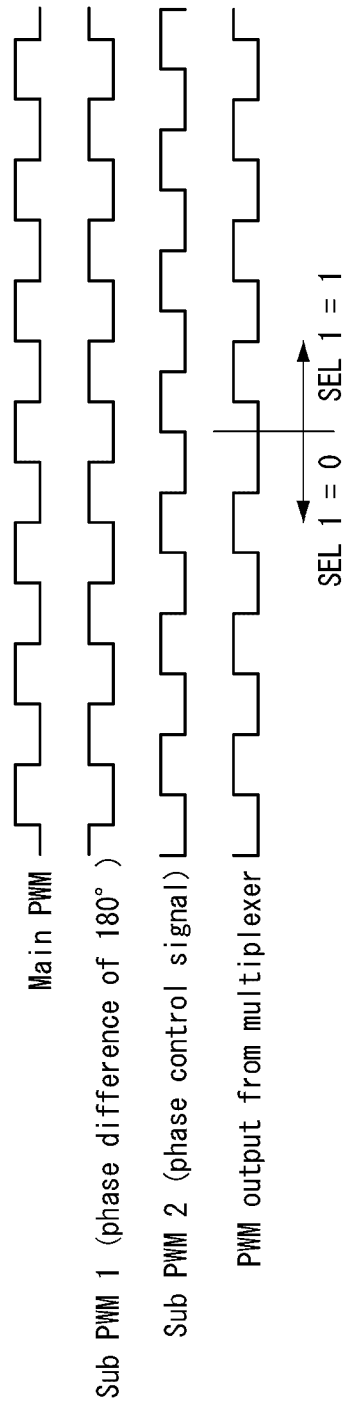
[Figure 14]

[Figure 15]
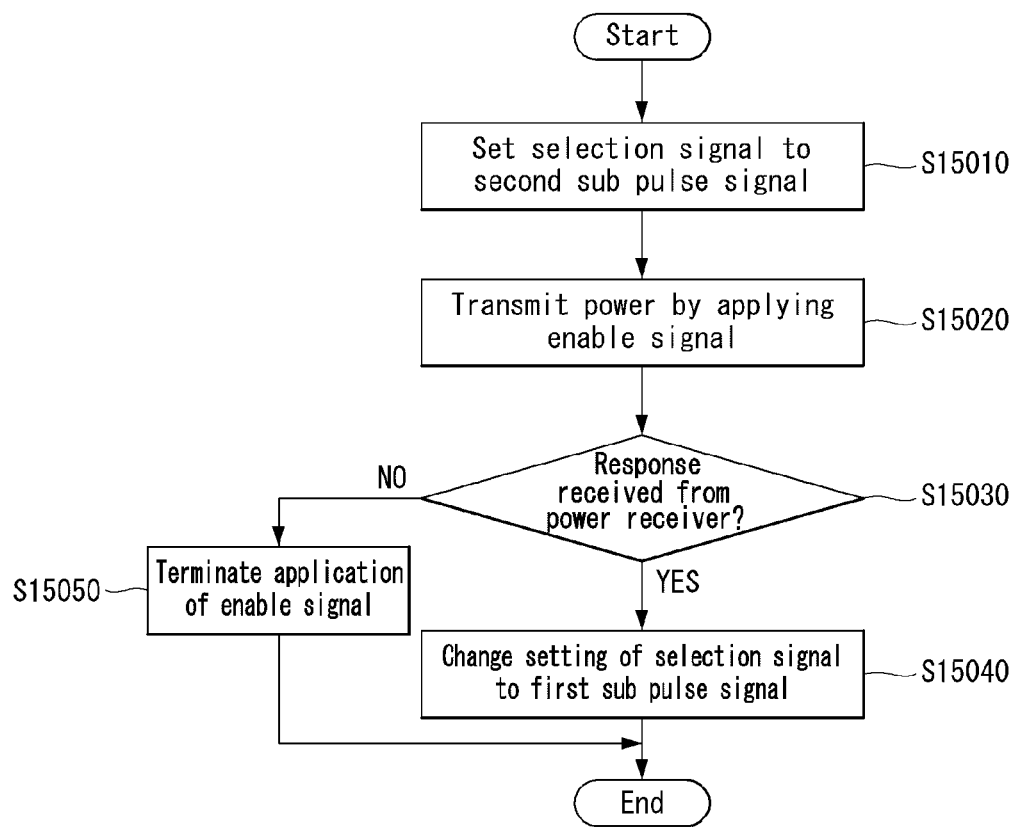

【Figure 16】
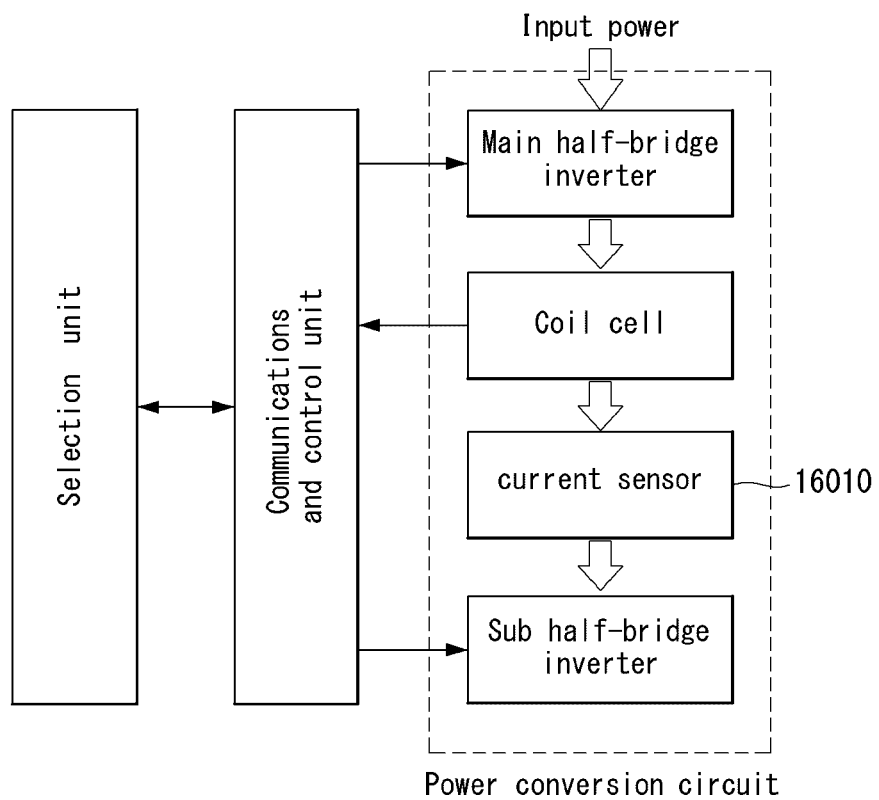

[Figure 17]
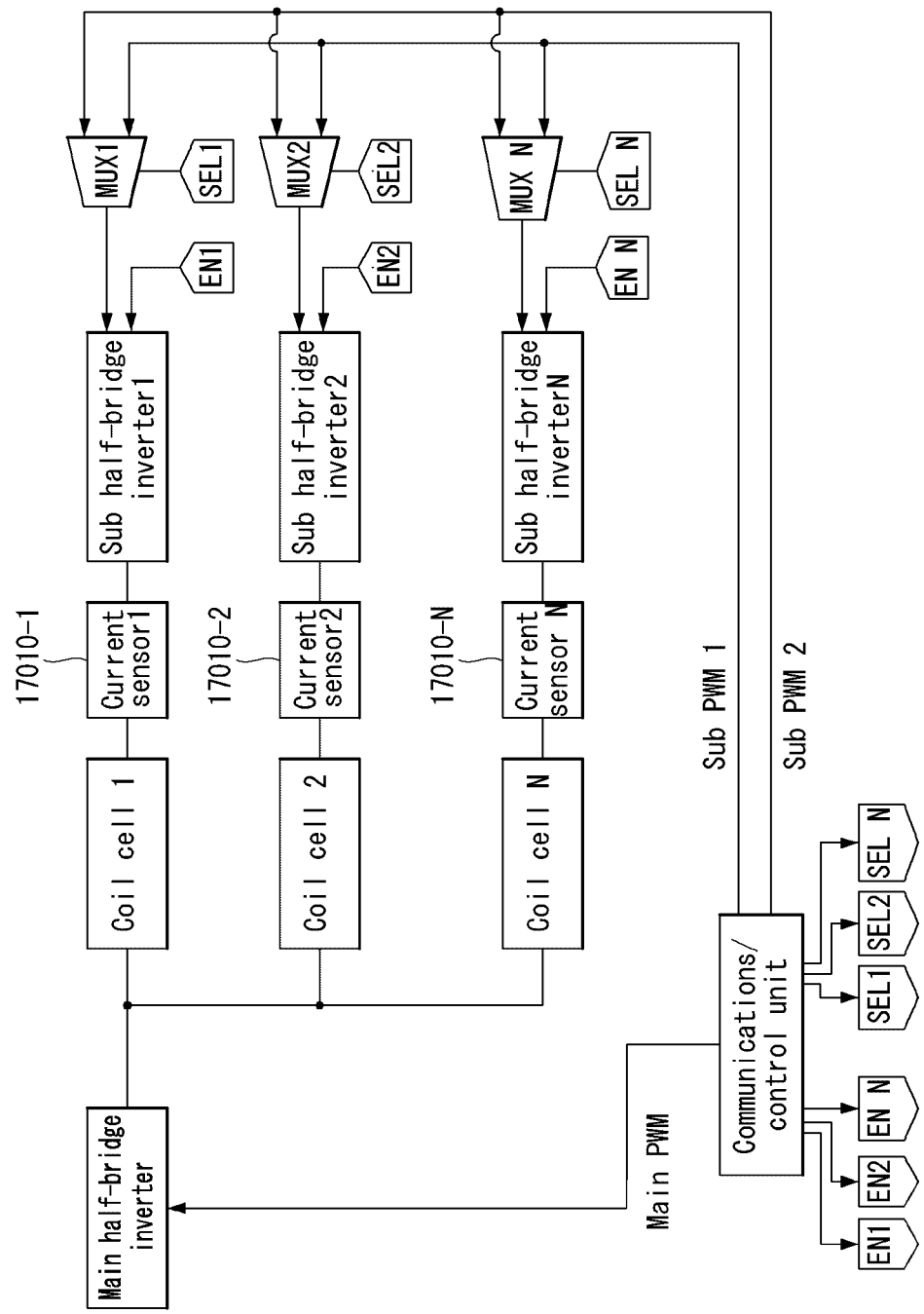

WIRELESS POWER TRANSMITTER AND WIRELESS POWER TRANSMISSION METHOD

CROSS REFERENCE TO RELATED APPLICATIONS

This application is the National Phase of PCT International Application No. PCT/KR2015/003594, filed on Apr. 10, 2015, which claims priority under 35 U.S.C. 119(e) to U.S. Provisional Application Nos. 61/978,592, filed on Apr. 11, 2014 and 61/979,867, filed on Apr. 15, 2014, all of which are hereby expressly incorporated by reference into the present application.

TECHNICAL FIELD

The present invention relates to a wireless power transmitter and a wireless power transmission method, and more particularly, to a wireless power transmitter which can charge one or multiple wireless power receivers and a wireless power transmission method.

BACKGROUND ART

Contactless wireless charging is an energy transfer method that electromagnetically transfers energy without wires, as opposed to the existing method that transmits energy through wires and uses it as a power source for electronics. Contactless wireless transmission methods include electromagnetic induction and resonant coupling. Electromagnetic induction is a power transfer method in which a power transmission part produces a magnetic field in a power transmitting coil (primary coil), and in which a receiving coil (secondary coil) is placed in a position where a current can be induced. Resonant coupling is the transmission of energy that uses resonance between a primary coil and a secondary coil, in which resonant mode energy is coupled between the coils as the primary coil and the secondary coil resonate at the same frequency.

DISCLOSURE

Technical Problem

Recently, electromagnetic inductive wireless chargers for mobile devices—that is, wireless power transmitters—are being developed. Notably, the WPC (Wireless Power Consortium) is working toward the standardization of wireless power transmission technology to enable interoperability across wireless power transmitters.

The released WPC standard is a low-power specification designed for charging low-power mobile devices. However, along with the diversification of mobile devices and the need for higher charging efficiency, there is growing demand for higher-power charging. Moreover, as wireless charging technology is rapidly becoming commercially available, there is also a need for methods that allow multiple mobile devices to be charged simultaneously for user convenience.

Technical Solution

The present invention has been made in an effort to solve the above-described technical problems, and one embodiment of the present invention provides a wireless power transmitter which is capable of charging a plurality of wireless power receivers, the wireless power transmitter including: a plurality of coil cells; a main half-bridge inverter to which a main pulse signal is applied; a plurality of sub half-bridge inverters to which a first sub pulse signal or second sub pulse signal is applied; a current sensor that monitors the current of the coil cells; and a communications and control unit that controls the pulse signals applied to the main half-bridge inverter and sub half-bridge inverters and that communicates with the wireless power receivers, wherein the sub half-bridge inverters may be respectively connected to the coil cells, and the first sub pulse signal may be a phase-inverted version of the main pulse signal and the second sub pulse signal may be a phase-controlled version of the main pulse signal.

In the wireless power transmitter according to the embodiment of the present invention, the communications and control unit may apply the second sub pulse signal to at least one of the sub half-bridge inverters to discover a power receiver.

In the wireless power transmitter according to the embodiment of the present invention, at least one of the coil cells receives a response from a power receiver, the communications and control unit may perform power transmission by applying the first sub pulse signal to the sub half-bridge inverter connected to the coil cell which has received the response from the power receiver.

In the wireless power transmitter according to the embodiment of the present invention, when at least one of the coil cells receives no response from a power receiver, the communications and control unit may disable the sub half-bridge inverters.

In the wireless power transmitter according to the embodiment of the present invention, when the wireless power receiver from which the response is received is an inductive-type wireless power receiver, the communications and control unit may perform power transmission by controlling the phase of the second power signal applied to the sub half-bridge inverter.

In the wireless power transmitter according to the embodiment of the present invention, the response from the wireless power receiver may comprise mode information, and the mode information may indicate whether the wireless power receiver is inductive-type or resonant-type.

In the wireless power transmitter according to the embodiment of the present invention, the second sub pulse signal may be applied to at least one of the sub half-bridge inverters, either simultaneously or sequentially.

Another embodiment of the present invention provides a wireless power transmission method for a wireless power transmitter including a main half-bridge inverter and a plurality of sub half-bridge inverters, the method including: setting a selection signal to apply a second sub pulse signal to at least of the one sub half-bridge inverters; transmitting power to at least one coil cell by applying an enable signal to the at least one sub half-bridge inverter; and when the at least one coil cell receives a response from a wireless power receiver, changing the selection signal to apply a first sub pulse signal to the at least one sub half-bridge inverter, wherein the first sub pulse signal is a phase-inverted version of a main pulse signal applied to the main half-bridge inverter and the second sub pulse signal is a phase-controlled version of the main pulse signal.

The wireless power transmission method according to the embodiment of the present invention may further include, when the at least one coil cell receives no response from a wireless power receiver, terminating the application of the enable signal.

The wireless power transmission method according to the embodiment of the present invention may further include, when the at least one coil cell receives a response from a wireless power receiver, determining whether the wireless power receiver is inductive-type or resonant-type.

The wireless power transmission method according to the embodiment of the present invention may further include, when the wireless power receiver is inductive-type, controlling the phase of the second sub pulse signal, instead of changing the selection signal.

In the wireless power transmission method according to the embodiment of the present invention, the response from the wireless power receiver may contain mode information, and the mode information may indicate whether the wireless power receiver is inductive-type or resonant-type.

In the wireless power transmission method according to the embodiment of the present invention, the enable signal is applied to the at least one sub half-bridge inverter, either simultaneously or sequentially.

Advantageous Effects

A wireless power transmitter according to the present invention can control power transmission in a proper way by identifying whether a wireless power receiver is resonant-type or inductive-type.

Particularly, the wireless power transmitter according to the present invention can identify the type of a wireless power receiver by receiving mode information from the wireless power receiver. Preferably, the wireless power transmitter may indicate the charging type—inductive-type or resonant-type—it supports by transmitting mode information.

Moreover, the wireless power transmitter according to the present invention can include a main half-bridge inverter and a plurality of sub half-bridge inverters, and can apply a plurality of sub pulse signals to the sub half-bridge inverters to apply power for communication or power for charging to a plurality of coil cells. With this structure, the wireless power transmitter can switch efficiently between the power for communication and the power for charging, and therefore discover and charge a plurality of wireless power receivers efficiently. Also, with this structure, circuit complexity can be reduced, and a plurality of coil cells can be controlled individually and efficiently.

Additionally, the wireless power transmitter according to the present invention can efficiently discover different types of wireless power receivers and perform charging control for each type.

BRIEF DESCRIPTION OF THE DRAWINGS

FIG. 1 shows a wireless power transmission/reception system according to an embodiment of the present invention.

FIG. 2 is a block diagram showing a power transmission/reception method according to an embodiment of the present invention.

FIG. 3 shows a method of power transfer control in inductive mode according to an embodiment of the present invention.

FIG. 4 shows power transmission equipment according to an embodiment of the present invention.

FIG. 5 shows power reception equipment according to an embodiment of the present invention.

FIG. 6 shows a power transmission method according to an embodiment of the present invention.

FIG. 7 shows a configuration packet transmitted by a power receiver and a configuration packet transmitted by a power transmitter according to an embodiment of the present invention.

FIG. 8 shows different operation methods and control flows depending on the type of a power transmitter and the type of a power receiver.

FIG. 9 shows an ID assignment packet according to an embodiment of the present invention.

FIG. 10 shows a frame structure for data communication during power transfer according to an embodiment of the present invention.

FIG. 11 shows a sync packet according to an embodiment of the present invention.

FIG. 12 is a view showing a power transmitter according to an embodiment of the present invention.

FIG. 13 is a view showing a power transmitter according to an embodiment of the present invention.

FIG. 14 shows a main pulse signal, sub pulse signals, and a multiplexer's output pulse signal according to an embodiment of the present invention.

FIG. 15 shows a method of operating a wireless power transmitter according to an embodiment of the present invention.

FIG. 16 is a view showing a power transmitter according to another embodiment of the present invention.

FIG. 17 is a view showing a power transmitter according to another embodiment of the present invention.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The foregoing description sets forth numerous specific details to convey a thorough understanding of the invention. However, it will be apparent to one skilled in the art that the invention may be practiced without these specific details.

Most of the terms used herein are general terms that have been widely used in the technical art to which the present inventive concept pertains, but some terms are arbitrarily chosen by the applicant in some cases so that their meanings are explained in detail in the following description. Hence, the present invention should be understood with the intended meanings of the terms rather than their simple names and meanings.

Recently, electromagnetic inductive wireless chargers for various electronics including mobile devices—that is, wireless power transmitters—are being developed. Notably, the WPC (Wireless Power Consortium) is working toward the standardization of wireless power transmission/reception technology to enable interoperability across wireless power transmitters. In this specification, a mobile device refers to an electronic device, such as a mobile phone, tablet PC, laptop, electric toothbrush, etc., that can be handheld and carried. In this specification, a mobile device will be described as an example of an electronic device that receives wireless power; however, this is only an embodiment and it should be apparent that the present invention is directed to a certain electronic device including a wireless power receiver.

Recently-developed wireless charging systems support low-power transmission/reception up to about 5 W. However, with the recent trend towards larger mobile devices and higher battery capacity, there are problems with low-power charging, such as long charging times and low efficiency. Hence, wireless charging systems are currently being developed to support medium-power transmission/reception up to about 15 W. In line with this, wireless charging systems that additionally incorporate resonant coupling for charging a plurality of electronic devices are also being developed. The present invention relates to a wireless charging system that additionally incorporates resonant coupling, and is intended to propose a resonant wireless charging transmitter/receiver that is compatible with a low-power/medium-power inductive wireless charging transmitter/receiver.

In what follows, a wireless power transmitter may be abbreviated as a power transmitter or a transmitter, and a wireless power receiver may be abbreviated as a power receiver or a receiver.

FIG. 1 shows a wireless power transmission/reception system according to an embodiment of the present invention.

In FIG. 1, the wireless power transmission/reception system includes a mobile device 1010 that wirelessly receives power and a base station 1020.

The mobile device 1010 includes a power receiver 1040 that receives wireless power through a secondary coil and a load 1030 that gets the power received by the power receiver, stores it, and supplies it to the device. The power receiver 1040 may include a power pick-up unit 1080 that receives a wireless power signal through the secondary coil and converts it to electrical energy, and a communications and control unit 1090 that controls communications and power signal transmission/reception (power transfer/reception) to and from a power transmitter 1050.

The base station 1020 is a device that provides inductive power or resonant power, which may include one or a plurality of power transmitters 1050 and 1060 and a system unit 1070. The power transmitter 1050 may transmit inductive/resonant power and control power transmission. The power transmitter 1050 may include a power conversion unit 1100 that converts electrical energy to a power signal and transfers it by creating a magnetic field through primary coil(s), and a communications and control unit 1110 that controls communications with and power transfer to the power receiver to transfer power at an appropriate level. The system unit 1070 may control other operations of the base station, such as input power provisioning, control of multiple power transmitters, and user interfacing. The base station 1020 may be hereinbelow referred to as power transmission equipment.

The power transmitter may control transmission power by controlling an operating point. The operating point to be controlled may correspond to a combination of frequency (phase), duty cycle, and voltage amplitude. The power receiver may control transferred power by controlling at least one of frequency (phase) duty cycle/duty ratio, and input voltage amplitude. Also, the power transmitter may supply constant power, and the power receiver may control receiving power by controlling the resonant frequency.

In what follows, a coil or a coil part may include a coil and at least one element close to the coil, and be referred to as a coil assembly, a coil cell, or a cell.

In this specification, a power transmitter/receiver may operate in inductive mode or in resonant mode. In inductive mode, the operation mode may be classified into low-power mode and medium-power mode according to the amount of power transmitted or received.

In inductive mode, the power transmitter/receiver may transmit and receive power at a given capacity/level. For example, power transmission levels may be classified into low-power transmission, medium-power transmission, high-power transmission, etc. In this specification, wireless power transmission/reception of up to about 5 W may be referred to as low-power mode transmission/reception, and wireless power transmission/reception of up to about 15 W may be referred to as medium-power mode transmission/reception. In some embodiments, low power may correspond to 0 to 10 W, and medium power may correspond to 10 to 20 W.

In resonant mode, a power transmitter may supply power to multiple power receivers simultaneously. Accordingly, resonant mode also may be referred to shared mode. In resonant mode, a power transmitter/receiver may transmit or receive power in a different way from inductive mode. Inductive mode may be referred to as exclusive mode, as opposed to shared mode.

Now, power transmission/reception phases will be described first.

FIG. 2 is a block diagram showing a power transmission/reception method according to an embodiment of the present invention.

In a wireless charging system according to the present invention, wireless charging may be performed in five phases. The five phases include a selection phase S2010, a ping phase S2020, an identification & configuration phase S2030, a negotiation phase S2040, and a power transfer phase S2050. The negotiation phase S2040 may be omitted in power transmission/reception in low-power mode. That is, in low-power mode, power transmission/reception is performed in four phases, and the negotiation phase S2040 may be additionally performed in medium-power mode.

In the selection phase S2010, the power transmitter monitors the interface surface for the placement and removal of objects. As shown in FIG. 2, the wireless power transmitter may detect a foreign object coming into contact by applying a power signal. In other words, the power transmitter may monitor the presence or absence of a foreign object by applying a short power signal to the primary coil and detecting the current in the primary coil, generated by this power signal. If the power transmitter receives signal strength information (packet) monitored in the selection phase S2010 and detects an object based on this information, it may attempt to select whether this object is a power receiver or only a foreign object (like a key, coin, etc.). In order for the selection to work, the power transmitter may perform at least one of the ping phase S2020, identification & configuration phase S2030, and negotiation phase S2040.

In the ping phase S2020, the power transmitter may perform digital ping and wait for a response from the power receiver. Digital ping refers to the application/transmission of a power signal for detecting and identifying a power receiver. If the power transmitter discovers a power receiver, the power transmitter may extend the digital ping to proceed to the identification & configuration phase S2030.

In the identification & configuration phase S2030, the power transmitter may identify the selected power receiver and obtain the power receiver's configuration information such as the maximum amount of power. In other words, the power transmitter may receive identification & configuration information and obtain information on the power receiver, and use this information to establish a power transfer contract. This power transfer contract may contain limits for several parameters that characterize the power transfer in the subsequent power transfer phase S2050.

In the negotiation phase S2040, the power receiver may negotiate with the power transmitter in order to create an additional power transfer contract. In other words, the power transmitter may receive a negotiation request/information from the power receiver, and the negotiation phase S2040 may be performed only when the receiver is identified as a medium-power receiver in the identification & negotiation phase S2030. In the negotiation phase S2040, additional parameters such as the power transmitter's guaranteed power level and the power receiver's maximum power may be negotiated. If the power receiver is a low-power receiver, the negotiation phase S2040 may be omitted, and the power transmitter may proceed directly to the power transfer phase S2050 from the identification & configuration phase S2030.

In the power transfer phase S2050, the power transmitter wirelessly provides power to the power receiver. The power transmitter may receive control data for the transmitting power and control the power transfer based on the control data. A violation of any of the stated limits on any of those parameters in the power transfer contract during power transfer causes the power transmitter to abort the power transfer—returning the system to the selection phase S2010.

FIG. 3 shows a method of power transfer control in inductive mode according to an embodiment of the present invention.

A power transmitter 3010 and power receiver 3020 in FIG. 3 each may include a power conversion unit 3030 and a power pick-up unit 3040, as illustrated in FIG. 1.

In the power transfer phase S2050 in the above-stated inductive mode, the power transmitter and the power receiver may control the amount of power transfer by performing communication along with power transmission/reception. The power transmitter and the power receiver operate at a specific control point. The control point refers to the combination of voltage and current provided at the output of the power receiver during power transfer.

More specifically, the power receiver selects a desired control point—a desired output current and/or voltage, a temperature measured particular position in the mobile device, etc. In addition, the power receiver determines its actual control point at which it is currently operating. Using the desired control point and actual control point, the power receiver may calculate a control error value and transmit this control error value as a control error packet to the power transmitter.

Then, the power transmitter may use the received control error packet to control power transfer by setting and controlling a new operating point—amplitude, frequency, and duty cycle. Accordingly, the control error packet is sent and received at regular time intervals in the power transfer phase, and in an embodiment, the power receiver may set the control error value to a negative number if it wants to decrease the current in the power transmitter and set the control error value to a positive number if it wants to increase the current in the power transmitter. In this way, in inductive mode, the power receiver may control power transfer by sending a control error packet to the power transmitter.

The resonant mode to be described below may operate in a different way from inductive mode. In resonant mode, a single power transmitter has to serve multiple power receivers simultaneously. However, in the control of power transfer in the above-stated inductive mode, transferred power is controlled via communication with a single power receiver, so it may be difficult to control the power transfer to additional power receivers. Accordingly, in the resonant mode according to the present invention, the power transmitter may transfer basic power common to power receivers, and the power receiver may control its resonant frequency to control the amount of received power. However, the method explained with reference to FIG. 3 is not completely excluded from the operation in resonant mode, but additional transmission power control may be performed in the method of FIG. 3.

FIG. 4 shows power transmission equipment according to an embodiment of the present invention.

In FIG. 4, the power transmission equipment 4010 may include at least one among a cover 4020 that covers a coil assembly, a power adaptor 4030 that supplies power to a power transmitter, a power transmitter 4040 that transmits wireless power, or a user interface 4050 that provides information about the progress of power transfer and other relevant information. Particularly, the user interface 4050 may be optionally included in the power transmission equipment 4010 or may be included as another user interface 4050 for the power transmission equipment 4010.

The power transmitter 4040 may include at least one among a coil assembly 4060, an impedance matching circuit 4070, an inverter 4080, a communication unit 4090, or a control unit 4100.

The coil assembly 4060 may include at least one primary coil that generates a magnetic field, and also may be referred to as a coil cell.

The impedance matching circuit 4070 may provide impedance matching between the inverter and the primary coil(s). The impedance matching circuit 4070 may generate a resonance at a frequency suitable to boost the primary coil current. In a multi-coil power transmitter, the impedance matching circuit may additionally include a multiplexer that routes a signal from the inverter to a subset of the primary coils. The impedance matching circuit also may be referred to as a tank circuit.

The inverter 4080 may convert DC input to an AC signal. The inverter 4080 may operate as a half-bridge inverter or a full-bridge inverter to generate a pulse wave of an adjustable frequency and a duty cycle. Also, the inverter may include a plurality of stages to adjust the input voltage level.

The communication unit 4090 may communicate with a power receiver. The power receiver performs load modulation in order to communicate a request or other information to the power transmitter. Accordingly, the power transmitter may monitor the amplitude and/or phase of the current and/or voltage in the primary coil, in order to demodulate data transmitted by the power receiver using the communication unit 4090. Furthermore, the power transmitter may control output power so as to transmit data via the communication unit 4090 by FSK (Frequency-shift keying).

The control unit 4100 may control the power transmitter's communication and power transfer. The control unit 4100 may control power transmission by adjusting the above-stated operating point. The operating point may be determined by at least one among operating frequency, duty cycle, and input voltage, for example.

The communication unit 4090 and the control unit 4100 may be provided as discrete units, devices, or chipsets or as a single unit, device, or chipset, as shown in FIG. 1.

FIG. 5 shows power reception equipment according to an embodiment of the present invention.

In FIG. 5, power reception equipment 5010 may include at least one among a user interface 5020 that provides information about the progress of power transfer and other relevant information, a power receiver 5030 that receives wireless power, and a base 5050 that supports and covers a load circuit 5040 or coil assembly. Particularly, the user interface 5020 may be optionally included in the power reception equipment 5010 or may be included as another user interface 5020 for the power reception equipment.

The power receiver 5040 may include at least one of a power converter 5060, an impedance matching circuit 5070, a coil assembly 5080, a communication unit 5090, or a control unit 5100.

The power converter 5060 may convert AC power, received from a secondary coil, to a voltage and current suitable for the load circuit. In an embodiment, the power converter 5060 may include a rectifier. Further, the power converter may adapt a reflected impedance of the power receiver.

The impedance matching circuit 5070 may provide impedance matching between the secondary coil and a combination of the power converter 5060 and the load circuit 5070. In an embodiment, the impedance matching circuit may generate a resonance of around 100 kHz which may enhance power transfer.

The coil assembly 5080 includes at least one secondary coil and, optionally, may further include an element for shielding the metal part of a receiver against a magnetic field.

The communication unit 5090 may perform load modulation in order to communicate a request and other information to the power transmitter. To this end, the power receiver 5030 may switch a resistor or capacitor on or off so that reflected impedance is changed.

The control unit 5100 may control received power. To this end, the control unit 5100 may determine/calculate the difference between the actual operating point of the power receiver 5030 and a desired operating point. Furthermore, the control unit 5100 may adjust/reduce the difference between the actual operating point and the desired operating point by making a request to adjust the reflected impedance of the power transmitter and/or the operating point of the power transmitter. If such a difference is minimized, optimal power reception can be achieved.

The communication unit 5090 and the control unit 5100 may be provided as discrete units, devices, or chipsets or as a single unit, device, or chipset, as shown in FIG. 1.

Hereinafter, a power transmission/reception system and method in resonant mode will be further described.

As stated above, the power transmission/reception system may operate in inductive mode and resonant mode, and, in inductive mode, it may operate in low-power mode and medium-power mode. In the present invention, however, a power transmitter may support receivers in both inductive and resonant modes. That is, the power transmitter may transmit power depending on the type of a discovered receiver,—that is, in resonant mode if the receiver is a resonant-type receiver and in inductive mode if the receiver is an inductive-type receiver. In the case of the inductive-type receiver, the power transmitter may transmit power in low-power mode and medium-power mode, depending on whether the receiver is a low-power receiver or medium-power receiver. To this end, the power transmitter may determine the type of a power receiver.

Now, a description will be given of a method in which a power transmitter and a power receiver detect whether the other end is in resonant mode or in inductive mode and perform wireless charging depending on their operation mode.

First of all, a resonant-type power transmitter determines the type of a power receiver by parsing the information contained in a packet received from the power receiver. Also, a resonant-type power receiver is driven in inductive mode until it reaches the negotiation phase, and determines the type of the power transmitter by parsing the information contained in a packet received from a power transmitter in the negotiation phase. If the power transmitter is in resonant mode, based on the parsed information, the resonant-type power receiver may change its operation mode from inductive mode to resonant mode. The power receiver in resonant mode may perform the power transfer phase in resonant mode or inductive mode, depending on the type of the power transmitter.

The information a transmitter and a receiver transmit to identify their type may be called mode information. In other words, the mode information may indicate whether the transmitter and the receiver operate in resonant mode and/or inductive mode.

As stated above, a power receiver may transmit a configuration packet to a transmitter in the identification & configuration phase. If the configuration packet indicates a request for the negotiation phase, the power transmitter may proceed to the negotiation phase. That is, it can be concluded that the receiver is in medium-power mode during inductive mode. If the configuration packet does not indicate a request for the negotiation phase, the power transmitter may proceed directly to the power transfer phase.

FIG. 6 shows a power transmission method according to an embodiment of the present invention.

FIG. 6 shows in detail the identification & configuration phase and negotiation phase of FIG. 2, particularly, a method in which a power transmitter and a power receiver identify each other's type and determine the operation mode. The identification & configuration phase S6010 and the negotiation phase S6020 correspond to the identification & configuration phase S2030 and negotiation phase S2040 of FIG. 2, respectively, and a description of this will be omitted to avoid redundancy but a supplementary explanation will be given instead.

In the identification & configuration phase S6010, the power receiver transmits an identification packet and a configuration packet to the power transmitter.

The identification packet contains the version (major/minor versions), manufacturer code, and basic device identifier of the power receiver. The power transmitter may identify the power receiver through the identification packet.

The configuration packet contains information about the configuration of the power receiver. In an embodiment of the present invention, the configuration packet may contain negotiation phase request information (Neg field). If the negotiation phase request information is set to 0 (Neg=0), the power transmitter may proceed directly to the power transfer phase without going through the negotiation phase. If the negotiation phase request information is set to 1 (Neg=1), the power transmitter may proceed to the negotiation phase. In an embodiment of the present invention, the configuration packet contains mode information. The mode information may indicate whether the power receiver supports only inductive mode or both inductive and resonant modes.

In the identification & configuration phase S6010, the power transmitter, upon receiving an identification packet and a configuration packet, may identify the type of the power receiver through the configuration packet. As stated above, the power transmitter may identify whether the power receiver is a low-power inductive-type receiver or a medium-power inductive-type receiver or a resonant-type receiver, by using the negotiation phase request information. Then, the power transmitter may identify whether the power receiver is a medium-power inductive-type receiver or a resonant-type receiver, by parsing the mode information.

If the power receiver is a low-power inductive-type receiver, the power transmitter may proceed to the power transfer phase without going through the negotiation phase S6020. If the power receiver is medium-power inductive-type or resonant-type, the power transmitter may transmit an acknowledgment (ACK) to the power receiver and proceed to the negotiation phase S6020.

In the negotiation phase S6020, an identification packet and a configuration packet may be transmitted to the power transmitter or power receiver. The identification packet transmitted by the power transmitter may contain version information (major/minor versions) and manufacturer information. The configuration packet transmitted by the power transmitted may contain power information and mode information.

In the negotiation phase S6020, the power transmitter performs power allocation and operation mode decision. If the power transmitter operates in resonant mode, it may perform ID assignment for at least one power receiver.

The power receiver may identify the type of the power transmitter based on the mode information received from the power transmitter. Since the power transmitter has proceeded to the negotiation phase, it may be identified as medium-power inductive-type or resonant-type. Then, the power receiver may identify whether the power transmitter is inductive-type or resonant-type, based on the mode information received in the negotiation phase S6020.

A medium-power inductive-type receiver may perform power reception and charging at full-power capacity supported for it. A resonant-type receiver may perform power reception and charging by selecting a power control method depending on the type of the transmitter. If the power transmitter is medium-power inductive-type, the power receiver may perform power reception and charging at full-power capacity.

FIG. 7 shows a configuration packet transmitted by a power receiver and a configuration packet transmitted by a power transmitter according to an embodiment of the present invention.

(a) of FIG. 7 shows the configuration packet the power receiver transmits in the above-stated identification & configuration phase. Descriptions of the fields contained in the configuration packet of (a) of FIG. 7 are as follows.

Power Class field: This field contains an unsigned integer value associated with a guaranteed power value.

Maximum Power field: This field indicates the maximum amount of power, which the power receiver expects to provide at the output of the rectifier.

Prop field: This field indicates the method of controlling power transfer in the power transfer phase.

Neg field (negotiation phase request information): If this field is set to a value of 1, the power transmitter transmits an ACK message and proceeds to the negotiation phase. If this field is set to a value of 0, the power transmitter proceeds to the power transfer phase without going through the negotiation phase.

FSK polarity (FSKPolarity) field: This field indicates whether the modulation polarity of the transmitter is a default value or a reversed value.

FSK depth (FSKDEpth) field: This field indicates the modulation depth of the transmitter.

Count field: This field indicates the number of optional configuration packets that the power receiver transmits in the identification & configuration phase.

Window Size field: This field indicates the window size for averaging received power.

Window Offset field: This indicates the interval between the window for averaging received power and a received power packet transmission.

Operation Mode (OP Mode) field: The above-stated mode information that indicates the operation mode supported by the power receiver. In an embodiment, if the operation mode field has a value of 0, this indicates inductive mode (=exclusive mode), and if the operation mode field has a value of 1, this indicates resonant mode (=shared mode).

(b) of FIG. 7 shows the configuration packet the power transmitter transmits in the above-stated negotiation phase. Descriptions of the fields contained in the configuration packet of (b) of FIG. 7 are as follows.

Guaranteed Power Class field: This field indicates the power receiver's power class. In an embodiment, a low-power transmitter may have a field value of 1, and a medium-power receiver may have a field value of 0.

Guaranteed Power field: This field indicates the amount of power for an appropriate reference power receiver that the power transmitter guarantees.

Potential Power Class field: This field indicates the power class of the power transmitter. In an embodiment, a low-power transmitter may have a field value of 1, and a medium-power receiver may have a field value of 0.

Potential Power field: This field indicates the amount of power that the power transmitter can potentially transfer to an appropriate reference power receiver.

Operation Mode (OP Mode) field: The above-stated mode information that indicates the operation mode supported by the power receiver. In an embodiment, if the operation mode field has a value of 0, this indicates inductive mode (=1:1 charging mode), and if the operation mode field has a value of 1, this indicates resonant mode (=shared mode).

FIG. 8 shows different operation methods and control flows depending on the type of a power transmitter and the type of a power receiver.

(a) of FIG. 8 shows the data flow between a low-power inductive-type power transmitter and each power receiver type.

In (a) of FIG. 8, since the power transmitter is low-power inductive type, it only supports low-power inductive type power transmission. Thus, a medium-power inductive-type receiver and a resonant-type receiver, as well as a low-power inductive-type receiver, operate in low-power inductive mode. Accordingly, the negotiation phase is omitted, as stated above, and in the digital ping phase, identification & configuration phase, and power transfer phase, data is transmitted from a receiver to the transmitter, and the receiver controls overall operation.

(b) of FIG. 8 shows the data flow between a medium-power inductive-type power transmitter and each power receiver type.

In (b) of FIG. 8, since the power transmitter is medium-power inductive type, it supports the low-power inductive-type power receiver and the medium-power inductive-type power receiver. Thus, if the power receiver is a low-power inductive receiver, it may operate in low-power inductive mode without going through the negotiation phase, and if the power receiver is a medium-power inductive receiver or a resonant receiver, it may operate in low-power inductive mode after going through the negotiation phase.

If the power receiver is driven in medium-power inductive mode, the power transmitter may transmit ID information or configuration information to the power receiver in the negotiation phase, thereby allowing for bidirectional communication in the negotiation phase. On the other hand, in the other phases, the transmitter transmits data to the receiver, and the overall operation of power charging is controlled by the receiver.

(c) of FIG. 8 shows the data flow between a resonant-type power transmitter and each power receiver type.

In (c) of FIG. 8, since the power transmitter is resonant-type, it supports both the inductive-type power receiver and the resonant-type power receiver for the respective type of the power receiver. Thus, the low-power inductive receiver operates in low-power inductive mode, the medium-power inductive receiver operates in medium-power inductive mode, and the resonant-type receiver operates in resonant mode, respectively. In the case of power transmission between a resonant transmitter and a resonant receiver, bidirectional data communication is performed in the power transfer phase as well. In the case of power transfer in resonant mode, the receiver controls received power by controlling its resonant frequency, and may further control received power by making a request to control the operating point of the power transmitter.

FIG. 9 shows an ID assignment packet according to an embodiment of the present invention.

A resonant-type power transmitter is able to charge multiple resonant-type power receivers simultaneously. But, it is necessary to assign IDs to the power receivers for communication when transmitting power to multiple resonant-type power receivers.

In FIG. 9, the ID field indicates ID information of at least one power receiver detected. When power transmission/reception is performed in resonant mode, the power receiver may send an ID request to the power transmitter. In this case, the power transmitter may assign an ID to the power receiver, and transmit the assigned ID information, contained in the ID assignment packet of FIG. 9, to the power receiver.

FIG. 10 shows a frame structure for data communication during power transfer according to an embodiment of the present invention.

In resonant mode, a power transmitter may act as a master and transmit a sync signal to a power receiver, and the power receiver may act as a slave and transmit a response signal to the sync signal. The communication between the power transmitter and the power receiver may be terminated if the power transmitter sends no sync signal. The sync signal, contained in a sync packet, and the response signal, contained in a response packet, may be allocated to a time slot in a time-division multiplexed frame, as in the structure of FIG. 10.

In resonant mode, the power transmitter has to communicate with multiple power receivers, and therefore may allocate time slots contained in a frame for communication to the power receivers. In this case, depending on the method of sync signal allocation, the power transmitter may use one sync signal per frame, as in (a) of FIG. 10, or may use multiple sync signals by allocating a sync signal to each time slot of a frame, as in (b) of FIG. 10. The allocation of time slots to power receivers may be performed using the ID and ID assignment packet explained with reference to FIG. 9.

The power transmitter may transmit a sync packet and receive status information of the power receiver as a response packet to the sync packet. The status information may include received power information or a power transmission termination request. For security purpose, the power receiver may transmit OV/OC/OT information even without receiving a sync signal.

FIG. 11 shows a sync packet according to an embodiment of the present invention.

A power transmitter may transmit a sync packet in order to receive a response from a particular power receiver. As shown in FIG. 11, the sync packet may contain an address ID (ADDR ID) field and a request field.

The address ID (ADDR ID) field may identify the target power receiver the power transmitter makes a request for response to. Address ID information for identifying the target power receiver may correspond to the ID information assigned through the ID assignment packet shown in FIG. 9. The power transmitter may use an address ID requesting responses from all power receivers currently being charged, as well as the address ID of a particular power receiver.

In an embodiment, if the value of the address ID field is 111b, all power receivers currently being charged may transmit a response in an allocated time slot. If the value of the address ID field indicates a particular power receiver, only that power receiver may transmit a response.

The request field may indicate the information the power transmitter requests the power receiver to send.

In an embodiment, the request field may request for the following responses depending on the field value.

If the value of the request field is 0001b, the power transmitter may request the power receiver for a status report. The status report may correspond to a received power packet, a power transmission termination packet, etc. If the value of the request field is 0010b, the power transmitter may make a request for renegotiation for power distribution. In other words, the power transmitter may request the power receiver to perform the negotiation phase again for power reallocation. Alternatively, the power transmitter may make a re-request for ID information, etc.

In another embodiment, the request field may request for the following responses depending on the field value.

If the value of the request field is 0001b, the power transmitter may request the power receiver to transmit received power information. If the value of the request field is 0010b, the power transmitter may request the power receiver to transmit rectified voltage information. If the value of the request field is 0011b, the power transmitter may request the power receiver to transmit a power transfer termination packet. If the value of the request field is 0100b, the power transmitter may request for renegotiation for power distribution. In other words, the power transmitter may request the power receiver to perform the negotiation phase again for power reallocation. If the value of the request field is 0101b, the power transmitter may request the power receiver to transmit ID information.

Hereinafter, a power transfer method for a power transmitter according to an embodiment of the present invention will be described in more detail.

The present invention is directed to provide a power transmitter capable of charging both an inductive power receiver and a resonant power receiver. As stated above, in the case of the inductive power receiver, the power transmitted by the power transmitter is controlled; whereas, in the case of the resonant power receiver, the power received by the power receiver is controlled. Accordingly, the power transmitted in resonant mode may be set to be higher or stronger than the power transmitted in inductive mode. Now, the design of an inverter for easily supporting both modes and the corresponding power transmission method will be further explained below.

FIG. 12 is a view showing a power transmitter according to an embodiment of the present invention.

The power transmitter of FIG. 12 will be described to give a supplementary explanation of the power transmitter of FIGS. 1 through 4. The above-described components of the power transmitter which are not shown in FIG. 12 are omitted for convenience of explanation, and may be included or excluded depending on the configuration.

In FIG. 12, the power transmitter may include a selection unit 12010, a communications and control unit 12020, and a power conversion unit 12030.

The selection unit 12010 is a circuit that detects the location or presence/absence of a power receiver, and may be optionally provided.

The communications and control unit 12020 communicates with a power receiver, executes the relevant power control algorithms and protocols, and drives the frequency of an AC waveform to control the power transfer. Particularly, in the present invention, the communications and control unit 12020 may control the operation of a sub half-bridge inverter 12070 and a pulse signal PWM for driving the sub half-bridge inverter 12070.

In the embodiment of FIG. 12, the power conversion unit 12030 is an inverter that converts DC input to an AC waveform that drives a resonant circuit, and may include a main half-bridge inverter 12040 to which a main pulse signal is applied, a sub half-bridge inverter 12070 to which a sub pulse signal is applied, a coil cell 12060 that generates a magnetic field, a current sensor 12050 that monitors the current through the coil cell. The coil cell 12060 may include a coil and a resonant capacitor.

A power transmitter according to the present invention may include a plurality of coil cells to charge multiple power receivers simultaneously. In this case, it is difficult to perform power control on each of the power receivers being charged simultaneously if only a single inverter is used for the plurality of coil cells. Moreover, although using multiple inverters to provide each coil cell with an inverter may allow for power control on each of the power receivers being charged simultaneously, it may add circuit complexity and increase the cost of circuit manufacture. Accordingly, the present invention proposes a power transmitter capable of controlling multiple power receivers more easily while reducing circuit complexity, by designing the power transmitter to have a main half-bridge inverter to which a main pulse signal is applied and to use a plurality of sub half-bridge inverters for a plurality of coil cells.

FIG. 13 is a view showing a power transmitter according to an embodiment of the present invention.

FIG. 13 shows the power transmitter of FIG. 12 in more detail.

In FIG. 13, the power transmitter includes a main half-bridge inverter 13010, a current sensor 13020, N coil cells 13030-1 to 13030-N, N sub half-bridge inverters 13040-1 to 13040-N, N multiplexers (MUX) 13050-1 to 13050-N, N enable terminals 13060-1 to 13060-N, N selection terminals (SEL) 13070-1 to 13070-N, and a communications and control unit 13080.

A main pulse signal (main PWM) may be applied to the main half-bridge inverter 13010, and a first sub pulse signal (sub PWM 1) or second sub pulse signal (sub PWM 2) may be applied to each of the sub half-bridge inverters 13040. The multiplexers 13050 may apply the first sub pulse signal or second sub pulse signal to the sub half-bridge inverters 13040 according to a selection input from the selection terminals 13070. In some applications, two or more sub pulse signals may be selectively applied.

The communications and control unit 13080 may apply an enable signal or disable signal to the enable terminals 13060 to enable or disable the sub half-bridge inverters 13040, respectively. In other words, the communications and control unit 13080 may apply an enable signal or terminate the application of the enable signal to enable or disable the sub half-bridge inverters 13040. Moreover, the communications and control unit 13080 may apply a selection signal to the selection terminals 13070 to select an output from the multiplexers 13050. The enable terminals 13060 and the selection terminals 13070 are controlled by the communications and control unit 13080, and may be optionally included depending on the design of the transmitter.

The power transmitter of FIG. 13 has the basic function of driving the main half-bridge inverter 13010, and may control the current flowing through each coil cell by enabling or disabling each sub half-bridge inverter or selectively applying a sub pulse signal to each sub half-bridge inverter, thereby providing efficient control of power transfer. A method of operation of an additional power transmitter will be described below in more detail.

FIG. 14 shows a main pulse signal, sub pulse signals, and a multiplexer's output pulse signal according to an embodiment of the present invention.

First of all, the main pulse signal (main PWM) may be a pulse signal with a particular amplitude and frequency. In this regard, the sub pulse signals are generated using the main pulse signal. That is, the first sub pulse signal (sub PWM 1) may be a phase-inverted version of the main pulse signal, i.e., a signal with a phase difference of 180° with respect to the main pulse signal, and the second pulse signal (sub PWM 2) may be a phase-controlled version of the main pulse signal.

Configuring the main pulse signal and the sub pulse signals in this way offers the advantage of using the following method of operation. As stated above, the main pulse signal is applied to the main half-bridge inverter, and the first sub pulse signal or second sub pulse signal is applied to the sub half-bridge inverters. If the first sub pulse signal is applied, the coil can provide its maximum power by the phase difference with respect to the main pulse signal. On the other hand, if the second sub pulse signal is applied, the coil can provide less power than the maximum by the phase difference with respect to the main pulse signal.

When the second sub pulse signal is applied, the amount of transferred power may differ depending on the degree of phase control. The closer the phase difference to be controlled is to 180°, the closer the amount of transferred power gets to the maximum, and the closer the phase difference to be controlled is to 0°, the smaller the amount of transferred power gets. In an embodiment, the second sub pulse signal may be a phase-controlled version of the main pulse signal with a phase difference of −90° to +90° with respect to the main pulse signal. This is because it is more efficient to control the first sub pulse signal if the phase difference is out of this range.

The sub pulse signals are switched by the multiplexer. The multiplexer may switch and output the sub pulse signals according to a selection signal. As in the embodiment of FIG. 14, if the communications and control unit applies a selection signal 1, the multiplexer may output the first sub pulse signal, and if the communications and control unit applies a selection signal 0, the multiplexer may output the second sub pulse signal.

The enable signal is a signal that enables actual power transmission. FIG. 13 illustrates that current is applied only when the enable signal is applied to the coil cells while the main pulse signal is applied to the main half-bridge inverter, thereby enabling power transfer.

As illustrated in FIG. 14, if the first sub pulse signal is applied to the sub half-bridge inverters, the coil cells may transfer high power, and if the second sub pulse signal is applied to the sub half-bridge inverters, the coil cells may transfer low power. In this specification, the power output by the coil cells may be referred to as power for charging if the first sub pulse signal is applied, and power for communication if the second sub pulse signal is applied. The power for communication may be used to discover a power receiver by applying a ping or digital ping when driving the circuit or to perform communication with the power receiver. Needless to say, although communication power may be used for charging by performing additional phase control, the second sub pulse signal may be referred to as power for communication for convenience of explanation.

By using the configuration shown in FIGS. 13 and 14, the power transmitter may discover at least one power receiver and perform power transmission by efficiently controlling a plurality of coil cells. A method of controlling the power transmitter of FIG. 13 using the signals of FIG. 14 will be described below with reference to FIG. 15.

FIG. 15 shows a method of operating a wireless power transmitter according to an embodiment of the present invention.

Although the operations shown in FIG. 15 are controlled by the communications and control unit, a description of them will be made on the assumption that they are controlled by a wireless power transmitter, for convenience of explanation. Also, FIG. 15 shows a method in which a power transmitter discovers a power receiver and performs other processes prior to power transmission by using the circuit of FIG. 13 and the pulse signals of FIG. 14. At the start of the method of FIG. 15, it is assumed that the power transmitter has not applied an enabled signal to any of a plurality of coil cells.

The power transmitter may set a selection signal to apply a second sub pulse signal (S15010). In other words, the power transmitter may set a selection signal for outputting the second sub pulse signal and apply it to a multiplexer. As in the above-described embodiment, if the selection signal is set to 0, the second sub pulse signal may be applied, and the communications and control unit may apply the selection signal 0 to the multiplexer via a selection terminal and output a desired second sub pulse signal.

The power transmitter may apply an enable signal to the sub half-bridge inverter of the first coil cell and transmit power (S15020). The transmitted power is power for communication, and may correspond to the above-mentioned ping or digital ping. Alternatively, the transmitted power may be used for the above-described data transmission by the power transmitter. In other words, the second sub pulse signal may be applied to the sub half-bridge inverter so that the first coil cell can transmit low power for driving the circuit and discovering a receiver.

The power transmitter may receive a response from the power receiver (S15030). The power transmitter may discover a power receiver by sensing a change across the primary coil caused by the applied power for communication by using a current sensor, and detect a response from the power receiver. The step 15030 shown in FIG. 15 involves the discovery of a power receiver and the reception of a response from the power receiver. This step may correspond to at least one of the identification and configuration phase and negotiation phase of FIG. 2.

Upon receiving a response from the power receiver, the power transmitter may change the selection signal setting to apply a first sub pulse signal (S15040). In the above-described embodiment, the communications and control unit may apply a first sub pulse signal to the sub half-bridge inverter by changing the selection signal to 1. As the first sub pulse signal is applied to the sub half-bridge inverter, the first coil cell may initiate power transfer by transmitting charging power.

If no response is received from the power receiver, the power transmitter may terminate the application of the enable signal (S15050). This is because, since no power receiver is discovered, the power transmitter may conclude that the first coil cell has no power receiver attached to it which requires charging.

In FIG. 15, the steps S15010 to 15050 may be performed for each coil cell. Accordingly, the power transmitter may perform the steps of FIG. 15 for the second coil cell and then all the way to the Nth coil cell (last coil cell) in the same manner, and then end the sequence. Then, after a certain time interval, or if a foreign object is discovered by an analog ping, the steps of FIG. 15 may be performed over again. The power transmitter may perform the steps of FIG. 15 only for coil cells which are not being charged with electricity or only for coil cells which have discovered a foreign object. Then, the second sub pulse signal may be time-division-multiplexed and supplied to only one coil at a time.

In addition, if a response is received from the power receiver (S15030), the power transmitter may operate differently depending on the type of the power receiver. If the power receiver is a resonant-type power receiver, the power transmitter may change the selection signal setting to apply the first sub pulse signal, as explained with reference to FIG. 15 (S15040). If the power receiver is an inductive-type power receiver, the power transmitter may transmit power by controlling the phase of the second sub pulse signal, without changing the selection signal setting.

For a resonant-type power receiver, the power transmitter may transmit high power and the power receiver then can adjust the resonant frequency and receive an appropriate amount of power. On the other hand, for an inductive-type power receiver, the power transmitter has to transmit an appropriate amount of power, because adjusting power from low power to high power is more advantageous in terms of the circuit and the stability of power transfer.

In an embodiment, a response from the power receiver may contain the above-described mode information. The power transmitter may parse received mode information and determine whether the power receiver is a resonant-type power receiver or inductive-type power receiver.

FIG. 16 is a view showing a power transmitter according to another embodiment of the present invention.

The configuration of the power transmitter of FIG. 16 is as illustrated in FIG. 12. But, the configuration of the current sensor 16010 is different from what is illustrated in FIG. 12, which will be explained in more detail with reference to FIG. 17. All the other parts, except for the position and configuration of the current sensor, are the same as described with reference to FIG. 12.

FIG. 17 is a view showing a power transmitter according to another embodiment of the present invention.

FIG. 17 shows the power transmitter of FIG. 16 in more detail.

The power transmitter shown in FIG. 17 includes the same sub units as the power transmitter shown in FIG. 13. That is, the power transmitter includes a main half-bridge inverter, N coil cells, N sub half-bridge inverters, N multiplexers, N enable terminals, N selection terminals, and a communications and control unit. However, FIG. 17 illustrates that, instead of one current sensor connected to the main half-bridge inverter shown in FIG. 13, N current sensors are included between each coil cell and each sub half-bridge inverter. All the other parts are the same as those shown in FIG. 13, except for the difference in configuration, and the difference in the configuration of current sensors will be described below.

The power transmitter of FIG. 17 may perform communication and control for each coil cell since current sensors are respectively connected to the coil cells. In other words, the method of FIG. 15 may be performed for all the coil cells at once, rather than one coil cell at a time in sequence.

In the method of FIG. 15, the power transmitter of FIG. 17 may transmit power for communication to all the coil cells by applying an enable signal to all the coil cells, i.e., all the sub half-bridge inverters, at once. Also, the power transmitter of FIG. 17 may transfer power by discovering a power receiver or communicating with the power receiver by the current sensors 17010-1 to -N and applying the first sub pulse signal only to coil cells which have acknowledged a response.

The power transmitter of FIG. 17 may operate differently depending on the type of the power receiver discovered in each coil cell, as explained with reference to FIG. 15. If a result of communication shows that the power receiver is inductive-type, the power transmitter of FIG. 17 may perform power transmission by controlling the phase of the already applied second sub pulse signal, without applying the first sub pulse signal. It should be noted that the phase of the first sub pulse signal may be shifted to a phase (e.g., the initial phase of the second sub pulse signal) that allows for initial power transmission, and the phase-shifted first sub pulse signal may be supplied to the other coils.

Using the power transmitter shown in FIGS. 16 and 17 enables multiple power receivers to be charged simultaneously and allows for communications with and control of each power receiver. Accordingly, multiple inductive-type receivers, as well as multiple resonant-type receivers, can be charged simultaneously, and both the inductive-type receivers and the resonant-type receivers can be charged simultaneously. Particularly, the power transmitter shown in FIGS. 16 and 17 supports as many inductive-type receivers as the number of sub pulse signals since it uses two or more sub pulse signals. That is, N inductive-type receivers can be charged simultaneously by controlling them individually with the use of N sub pulse signals.

It will be apparent to those skilled in the art that numerous modifications and variations can be made to the invention without departing from the spirit or scope of the present invention. Thus, the invention is intended to cover modifications and variations provided in the appended claims and their equivalent ranges.

Both the device and method inventions are mentioned herein, the description of both the device and method inventions can be complementary to each other.

Various embodiments have been described in the best mode for carrying out the present invention.

INDUSTRIAL APPLICABILITY

The present invention is used in a series of wireless charging technologies.

It will be apparent to those skilled in the art that numerous modifications and variations can be made to the invention without departing from the spirit or scope of the present invention. Thus, the invention is intended to cover modifications and variations provided in the appended claims and their equivalent ranges.

The invention claimed is:

1. A wireless power transmitter which is capable of charging a plurality of wireless power receivers, the wireless power transmitter comprising:
    a plurality of coil cells;
    a main half-bridge inverter to which a main pulse signal is applied;
    a plurality of sub half-bridge inverters to which a first sub pulse signal or a second sub pulse signal is applied;
    a current sensor configured to monitor the current of the coil cells; and
    a communications and control unit configured to control the pulse signals applied to the main half-bridge inverter and sub half-bridge inverters and communicate with the wireless power receivers,
    wherein the sub half-bridge inverters are respectively connected to the coil cells, and the first sub pulse signal is a phase-inverted version of the main pulse signal and the second sub pulse signal is a phase-controlled version of the main pulse signal.

2. The wireless power transmitter of claim 1, wherein the communications and control unit applies the second sub pulse signal to at least one of the sub half-bridge inverters to discover a power receiver.

3. The wireless power transmitter of claim 2, wherein, when at least one of the coil cells receives a response from a power receiver, the communications and control unit performs power transmission by applying the first sub pulse signal to the sub half-bridge inverter connected to the coil cell which has received the response from the power receiver.

4. The wireless power transmitter of claim 2, wherein, when at least one of the coil cells receives no response from a power receiver, the communications and control unit disables the sub half-bridge inverters.

5. The wireless power transmitter of claim 3, wherein, when the wireless power receiver from which the response is received is an inductive-type wireless power receiver, the communications and control unit performs power transmission by controlling the phase of the second power signal applied to the sub half-bridge inverter.

6. The wireless power transmitter of claim 3, wherein the response from the wireless power receiver comprises mode information, and the mode information indicates whether the wireless power receiver is inductive-type or resonant-type.

7. The wireless power transmitter of claim 2, wherein the second sub pulse signal is applied to at least one of the sub half-bridge inverters, either simultaneously or sequentially.

8. A wireless power transmission method for a wireless power transmitter comprising a main half-bridge inverter and a plurality of sub half-bridge inverters, the method comprising:
    setting a selection signal to apply a second sub pulse signal to at least one of the sub half-bridge inverters;
    transmitting power to at least one coil cell by applying an enable signal to the at least one sub half-bridge inverter; and
    when the at least one coil cell receives a response from a wireless power receiver, changing the selection signal to apply a first sub pulse signal to the at least one sub half-bridge inverter,
    wherein the first sub pulse signal is a phase-inverted version of a main pulse signal applied to the main half-bridge inverter and the second sub pulse signal is a phase-controlled version of the main pulse signal.

9. The method of claim 8, further comprising, when the at least one coil cell receives no response from a wireless power receiver, terminating the application of the enable signal.

10. The method of claim 8, further comprising, when the at least one coil cell receives a response from a wireless power receiver, determining whether the wireless power receiver is inductive-type or resonant-type.

11. The method of claim 10, further comprising, when the wireless power receiver is inductive-type, controlling the phase of the second sub pulse signal, instead of changing the selection signal.

12. The method of claim 8, wherein the response from the wireless power receiver comprises mode information, and the mode information indicates whether the wireless power receiver is inductive-type or resonant-type.

13. The method of claim 8, wherein the enable signal is applied to the at least one sub half-bridge inverter, either simultaneously or sequentially.

\* \* \* \* \*